J. DUTCHER.
Sleigh-Brake
No. 29,251.
Patented July 24, 1860.
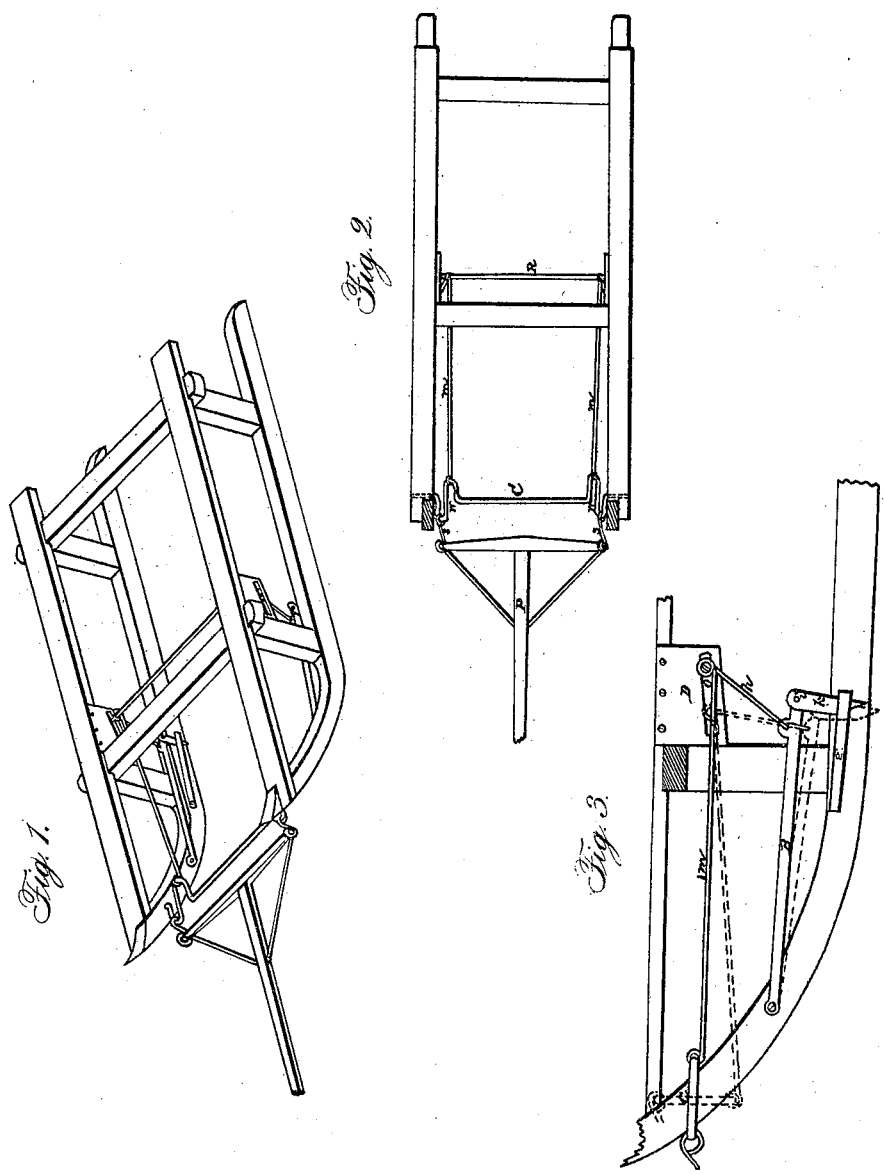
Witnesses:
Hugh Young
Joshua Howard
Inventor:
Jacob Dutcher
by his Attorney
N. DuBois

UNITED STATES PATENT OFFICE.

JACOB DUTCHER, OF GIBSON, PENNSYLVANIA.

SELF-ACTING SLEIGH-BRAKE.

Specification of Letters Patent No. 29,251, dated July 24, 1860.

*To all whom it may concern:*

Be it known that I, JACOB DUTCHER, of Gibson, in the county of Susquehanna and State of Pennsylvania, have invented certain new and useful Improvements in Self-Acting Brakes; and I do hereby declare that the following is a full and exact description thereof, reference being had to the accompanying drawings and to the letters of reference marked thereon.

The nature of my invention consists in the manner of operating a self acting brake for sleighs or other land vehicles for the purpose of stopping them.

Figure 1 is a perspective view of a common sleigh showing the manner of attaching the brake. Fig. 2 is a plan of the same showing more plainly the shape of the roller or crank shaft C. Fig. 3 is an enlarged section showing the arrangement of the different parts of the brake. The letters of reference being the same in each figure.

The roller C to which the draft-pole is attached is bent at each end similar to a crank as shown at W, (Fig. 2) and is connected with the draft-pole by the rods $s, s$.

$m, m$, are rods connecting the roller with the cross rod R.

$h, h$, are lifting rods attached to the rod R and bar B.

$k, k$, are the shoes or knives.

$g, g$, are guides for the knives, and are fastened to the inside of the runners so as to leave a space for the knives to move up and down and back and forth.

D, D, are plates fastened to the raves of the sleigh with oblique slots for the ends of the cross rod R, to slide in.

By this arrangement it will be seen that when the pole is drawn forward the different parts are in the position shown in Fig. 3,— the knives being brought up clear from the ground or snow, but when the pole is pressed backward the roller turns on the ends which pass through the runners and by means of the longitudinal rods $m, m$, the cross rod R, is drawn forward in the slots $o, o$, and the knives $k, k$, are lowered, so as to catch in the ground or snow, thus retarding the motion. The position of the various parts, when in operation, is shown by the dotted lines in Fig. 3. The knives $k, k$, being free to move on the pivots at $i, i$, do not interfere in backing the sleigh, as by striking the ground or snow they are thrown up out of the way. The same device for a roller may be used in operating self acting brakes attached to wagons or other land vehicles.

What I claim as my invention and desire to secure by Letters Patent is—

Constructing the roller to which the draft-pole is attached so as to act like a crank as set forth, in combination with the longitudinal rods $m, m$, cross rod R, lifting rods $h, h$, bars B, B, and knives or shoes $k, k$, the whole arranged and operating substantially as set forth.

JACOB DUTCHER.

Witnesses:
B. LEVO,
A. G. TOWNSEND.